(12) United States Patent
Sato et al.

(10) Patent No.: US 6,899,823 B2
(45) Date of Patent: May 31, 2005

(54) LIQUID CRYSTAL DEVICE

(75) Inventors: Koichi Sato, Kanagawa (JP); Jun Kamatani, Kanagawa (JP)

(73) Assignee: Canon Kabushiki Kaisha, Tokyo (JP)

(*) Notice: Subject to any disclaimer, the term of this patent is extended or adjusted under 35 U.S.C. 154(b) by 261 days.

(21) Appl. No.: 10/025,535

(22) Filed: Dec. 26, 2001

(65) Prior Publication Data

US 2002/0102366 A1 Aug. 1, 2002

(30) Foreign Application Priority Data

| Dec. 27, 2000 | (JP) | 2000/399239 |
| Mar. 29, 2001 | (JP) | 2001/097341 |
| Mar. 30, 2001 | (JP) | 2001/102511 |
| Dec. 21, 2001 | (JP) | 2001/388608 |

(51) Int. Cl.$^7$ .............................................. C09K 19/52
(52) U.S. Cl. ........................ 252/299.62; 252/299.64; 252/299.3
(58) Field of Search ................. 252/299.01, 299.1, 252/299.2, 299.3, 299.4, 299.6, 299.61, 299.62, 299.63, 299.64, 299.65, 299.66, 299.67; 428/1.1, 1.2, 1.3; 349/10, 182–186

(56) References Cited

U.S. PATENT DOCUMENTS

| 4,834,509 A | * | 5/1989 | Gunjima et al. ............... 349/89 |
| 5,437,811 A | * | 8/1995 | Doane et al. .......... 252/299.01 |
| 5,667,720 A | * | 9/1997 | Onishi et al. .......... 252/299.01 |
| 5,858,268 A | * | 1/1999 | Niiyama et al. ....... 252/299.01 |
| 5,861,198 A | * | 1/1999 | Yamaguchi et al. ........ 428/1.23 |
| 5,948,486 A | * | 9/1999 | Sage et al. ................... 428/1.1 |
| 6,017,466 A | * | 1/2000 | Fujino et al. .......... 252/299.01 |
| 6,217,948 B1 | * | 4/2001 | Verrall et al. ............... 427/492 |
| 6,404,464 B1 | * | 6/2002 | Faris et al. .................... 349/15 |
| 6,491,990 B1 | * | 12/2002 | Parri et al. .................... 428/1.1 |
| 6,514,578 B1 | * | 2/2003 | Farrand ...................... 428/1.1 |
| 6,565,932 B2 | * | 5/2003 | Iwamatsu et al. ............ 428/1.1 |
| 6,773,626 B2 | * | 8/2004 | Sanada et al. ......... 252/299.01 |

FOREIGN PATENT DOCUMENTS

| EP | 0 972 818 | * | 1/2000 | ........... C09K/19/30 |
| GB | 2 330 360 | * | 4/1999 | ........... C09K/19/38 |

* cited by examiner

*Primary Examiner*—Mark F. Huff
*Assistant Examiner*—Jennifer R. Sadula
(74) *Attorney, Agent, or Firm*—Fitzpatrick, Cella, Harper & Scinto

(57) ABSTRACT

A compound or a polymer thereof promises an advantageous use for an ink-jet ink or a polymer dispersion liquid crystal display. The compound has a structure represented by the formula $$A-B-D-(E-G)_e-(J)_j-K-L$$

where A represents an acrylic or methacrylic group, B represents a single bond or an alkyl group, D represents a single bond, —O—, —COO— or —OCO—, E represents an aromatic or aliphatic ring that may be substituted or not substituted and may be identical with or different from each other when e is not smaller than 2, G represents a single bond, —O—, —COO—, —OCO—, —CH=CH— or —C≡C— that may be identical with or different from each other when e is not smaller than 2, J represents an aromatic or aliphatic ring that may be substituted or not substituted and may be identical with or different from each other when j is not smaller than 2, K represents a single bond, —O—, —COO— or —OCO—, L represents an alkyl group or polyoxyethylene group having a substituted OH or COOH at a end or a side chain, e represents an integer from 0 to 5 and j represents an integer from 0 to 5, e+j being not smaller than 2.

4 Claims, 2 Drawing Sheets

LIQUID CRYSTAL DEVICE

BACKGROUND OF THE INVENTION

1. Field of the Invention

This invention relates to novel chemical compounds and polymeric compounds formed from any of the compounds. The present invention also relates to ink realized by using such a polymeric compound and a liquid crystal device having a sandwich structure that holds a polymer dispersion liquid crystal made of such a polymeric compound and a liquid crystal.

2. Related Background Art

It is well-known that many chemical compounds have in a molecule both a hydrophobic group and a hydrophilic group, which tend to form a micellar structure. Many of such compounds can be made to show fascinating properties when they are provided with a molecular skeleton having an aromatic ring therein. Compounds of this type can be made to have various functions within molecules. Thus, particularly when forming a composition, a mixture or a solution for a specific application by using such a compound, it is possible to make the compound show one or more than one useful property for controlling the interaction of molecules of the compound with surrounding molecules or particles (of a dye or a pigment for instance). Remarkable technological developments have been achieved by using this technique in a number of industrial fields, including ink-jet recording and polymer dispersion liquid crystal, to name a few.

Known image forming technologies include ink-jet recording and electrophotography, of which ink-jet recording has been playing an important role in the field of high quality color imaging. While water soluble inks containing one or more than one dye as coloring matter have been used popularly for ink-jet recording, the image preserving ability of such inks has been questioned in recent years. Efforts are therefore being made to develop dye inks that are highly resistant to weather, light and gas and also dispersed type inkjet inks that are prepared by dispersing particles of one or more than one pigment and adapted to stably maintain the dispersed condition of pigment particles for a long time period. As for dispresed type ink-jet inks, selection of highly dispersible materials is vital to making them highly functional.

Meanwhile, liquid crystal panels using polymer dispersion liquid crystals have been developed. FIG. 3 of the accompanying drawings schematically illustrates such a known liquid crystal panel. Referring to FIG. 3, the liquid crystal panel that is generally denoted by $P_2$ comprises a pair of glass substrates $1a$, $1b$ arranged vis-a-vis with a predetermined gap separating them and provided with respective electrodes $3a$, $3b$. A polymer dispersion liquid crystal prepared by dispersing a liquid crystal in a polymeric material is held between the glass substrates $1a$, $1b$. The liquid crystal panel is adapted to display an image by applying a voltage between the electrodes $3a$, $3b$. The performance of the device is significantly influenced by the dispersal system between the polymer that is the host material and the liquid crystal that is the guest material.

However, known compounds, particularly polymeric compounds, which are used for any of the applications listed above, show poor dispersion and poor solubility when mixed with some other material, resulting in a great disadvantage in performance. For example, in the case of inks to be used for an ink-jet printer, known compounds are poorly soluble in an aqueous solvent and are poorly dispersed when used with dyes. On the other hand, in the case of a polymer dispersion liquid crystal, known polymeric compounds are also poorly dispersive when used with a liquid crystal to possibly cause uneven brightness or contrast and can cause a long response time at the change of drive conditions. Additionally, if the polymeric compound and the low molecular weight liquid crystal compound are in a state of insufficient phase separation or not in a state of a clear phase separation, a switching operation is very indiscriminable and/or the device needs a thermal treatment, particularly when it has to be reset to the initial state. These and other problems make such polymeric compounds very disadvantageous in practical applications.

SUMMARY OF THE INVENTION

In view of the above-identified circumstances, it is therefore the object of the present invention to provide novel compounds, or novel polymeric compounds, that are highly dispersive when used with a liquid crystal material for forming a polymer dispersion liquid crystal or with a dye or a pigment for forming an ink composition.

According to the invention, the above object is achieved by providing compounds expressed by general formula (1) below and having a hydrophilic part and a hydrophobic part in the molecule and a molecular skeleton similar to that of an ordinary liquid crystal molecule:

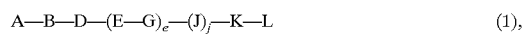

$$A-B-D-(E-G)_e-(J)_j-K-L \qquad (1),$$

where A represents an acrylic group or a methacrylic group, B represents a single bond or an alkyl group, D represents —O—, —COO— or —OCO—, E represents an aromatic ring or an aliphatic ring that may or may not be substituted and may be identical with or different from each other when e is not smaller than 2, G represents a single bond, —O—, —COO—, —OCO—, —CH=CH— or —C≡C— that may be identical or different when e is not smaller than 2, J represents an aromatic ring or an aliphatic ring that may or may not be substituted and may be identical with or different from each other when j is not smaller than 2, K represents a single bond, —O—, —COO— or —OCO—, L represents an alkyl group or a polyoxyalkylene group having a substituted OH or COOH at an end or a side chain, e represents an integer between 0 and 5 and j represents an integer between 0 and 5, e+j being not smaller than 2.

In another aspect of the invention, there are provided polymeric compounds having two or more than two monomer unit structures, each being expressed by general formula (2) below:

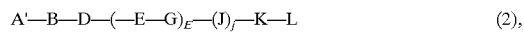

$$A'-B-D-(-E-G)_E-(J)_j-K-L \qquad (2),$$

where A' represents a monomer unit of polyacryl or polymethacryl).

In still another aspect of the invention, there is provided an image forming material containing at least a compound or polymeric compound as mentioned above. If desired, such an image forming material may contain a dye or a pigment.

In still another aspect of the invention, there is provided a method of using such an image forming material and adapted to form an image by ejecting the image forming material from an image forming material nozzle of an ink-jet system and applying it to an image forming medium for forming an image thereon.

In a further aspect of the invention, there is provided a liquid crystal device comprising a pair of substrates pro vided respectively with electrodes and a liquid crystal composition containing at least such a polymeric compound and arranged between the substrates.

Since compounds according to the invention have a hydroxy group at an end of the molecule, they dissolve well into water. Additionally, they have an aromatic group and potentially show a liquid crystal property. Therefore, they are highly dispersive in a liquid crystal material.

When a compound according to the invention is used in ink-jet printer ink, an image forming material is provided by adding a dye or a pigment to the compound.

A polymer dispersion liquid crystal device that is free from uneven brightness and contrast and highly energy saving is provided by using a compound according to the invention.

DESCRIPTION OF THE PREFERRED EMBODIMENTS

Some specific examples of compounds having a structure expressed by the general formula (1) above are listed below:

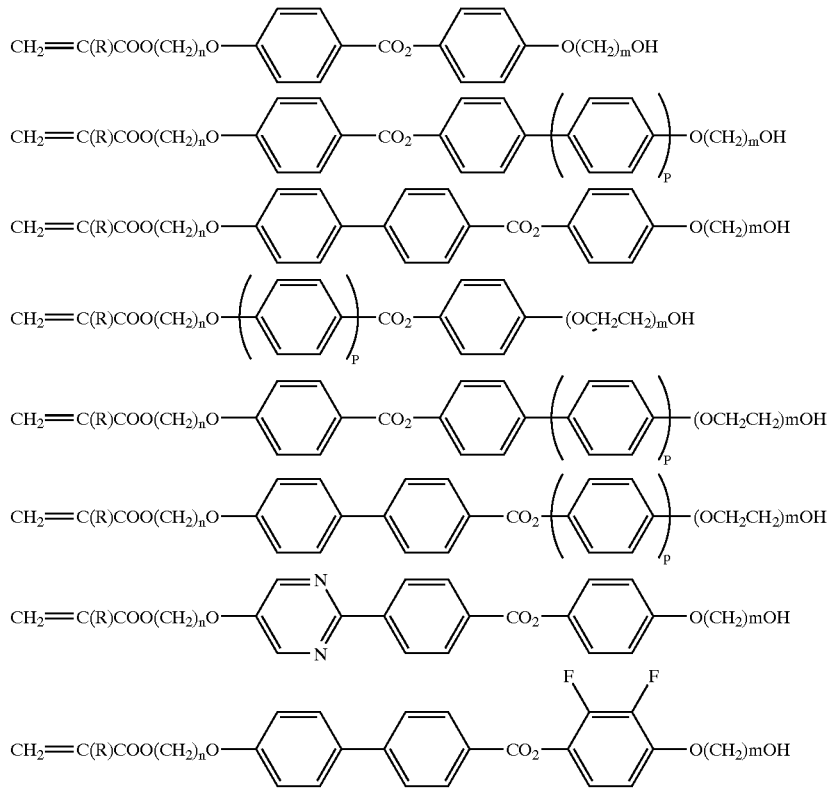

where R represents a hydrogen atom or a methyl group, n represents an integer between 1 and 20, m represents an integer between 1 and 20 and P represents an integer between 1 and 5.

Compounds according to the invention are characterized by having a chemical structure expressed by the general formula (1) shown above. Structurally, compounds expressed by the general formula (1) include a molecule that has both a hydrophilic part and a hydrophobic part along with a site having an aromatic ring somewhere in the middle, which gives the compound a strong affinity for coloring materials, such as a dye and a pigment. The inventors of the present invention presume that an image forming material according to the invention shows an excellent dispersion property, because of both of the hydrophilicity and the hydrophobicity and the affinity for coloring materials of dyes and pigments.

If a compound according to the invention has an acrylic group or a methacrylic group within the hydrophobic group of the molecule, a polymer can be formed from the compound by causing such groups to react for polymerization. Such polymerization can be made to take place in the course of manufacturing an image forming material or a polymer dispersion liquid crystal device according to the invention. For example, the compound may be mixed with a pigment, water and one or more than one additive to produce a well-dispersed state for the compound and subsequently subjected to a polymerizing process typically using ultraviolet rays to stabilize the well-dispersed state.

It is known that ordinary dispersants, such as surfactants, can easily lose their dispersibility by an external excitation, such as heat, acid or base. On the other hand, in various steps of an image forming process including transfer of ink, printing or development, transfer and fixation where ink is exposed to different environments, ink is required to pass through those steps without losing its chemical stability. From this point of view, an ink material formed by using a polymeric compound according to the invention can be highly suitable for use with various image forming methods. Therefore, compounds according to the invention can provide very useful image forming materials.

Figure 1A:
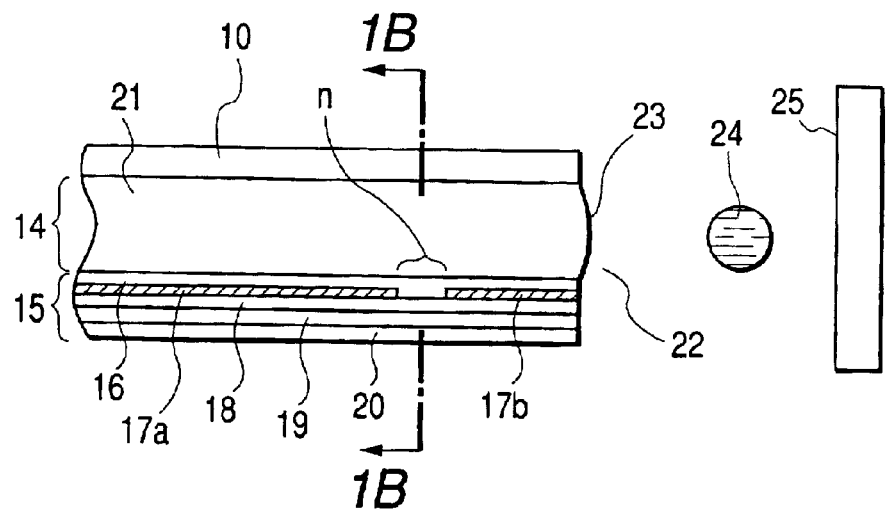
FIGS. 1A, 1B and 1C schematically illustrate the head of the ink-jet printer of an image forming apparatus for which an image forming material according to the invention can advantageously be used, FIG. 1A being a schematic cross-view taken along the ink-shooting direction, FIG. 1B being a schematic cross-sectional view of a part of the heater of the head, FIG. 1C being a schematic perspective view of the head.
Figure 1B:
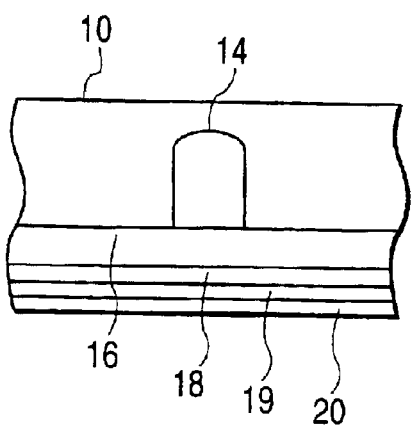
Figure 1C:
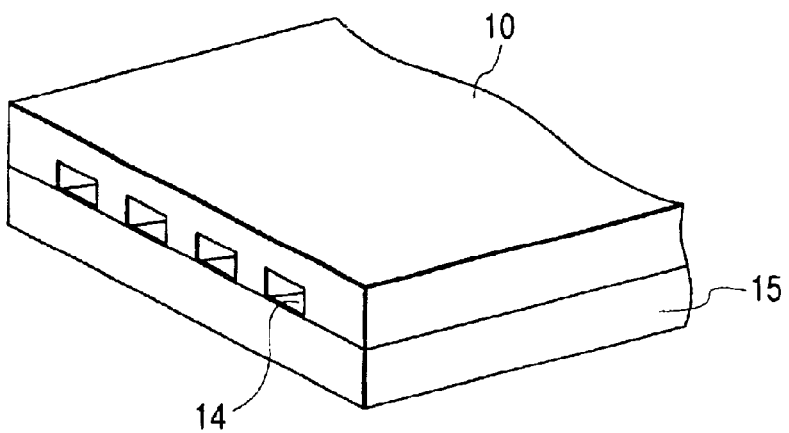

Now, the head of an ink-jet printer that can be used with ink according to the invention will be briefly described below. FIGS. 1A through 1C schematically illustrate the head of such an ink-jet printer. FIG. 1A is a schematic cross-sectional view taken along the ink ejecting direction and FIG. 1B is a schematic cross-sectional view of a part of the heater of the head, while FIG. 1C is a schematic perspective view of the head. It will be appreciated that the head is a bubble jet type ink-jet head using an electrothermal converter as an energy generating element, although a piezo jet type ink-jet head using a piezoelectric element may alternatively and advantageously be used for the purpose of the invention.

Referring to FIGS. 1A through 1C, there are shown a substrate 10, a groove 14 operating as an ink flow path, a heater 15, a protection film 16, a pair of aluminum electrodes 17a and 17b, a resistance heating layer 18, a heat accumulator layer 19, another substrate 20, ink 21, an orifice 22, a meniscus 23, an ink droplet 24 and a recording medium 25.

The ink-jet head of FIGS. 1A through 1C is formed by bonding the substrate 10 that has the groove 14 as the ink flow path and is typically made of glass, ceramic or plastic and the heater 15 to be used for thermographic recording. The heater 15 is formed by assembling the protection layer 16 that is typically made of silicon oxide, the pair of aluminum electrodes 17a and 17b, the resistance heating layer 18 that is typically made of nickel-chromium, the heat accumulator layer 19 and the substrate 20 that is typically made of alumina and adapted to emit heat efficiently. Normally, ink is made to get to the ejection orifice (microaperture) 22 and produce a meniscus 23 there under pressure. As an electric signal is applied to the electrodes 17a and 17b, the region of the heater 15 indicated by n fiercely generates heat so that the ink 21 held at the heater 15 generates air bubbles. Then, the meniscus 23 is forced to move forward due to the pressure applied by the generated air bubbles so that eventually an ink droplet 24 is ejected and driven to fly toward the recording medium 25, which may be a sheet of paper. Normally, the ink-jet head is formed by arranging a number of heads, each having a configuration, which is the same as the one described above, in a manner as shown in FIG. 1C.

An ink-jet printer normally comprises an ink-jet head as described above, an ink tank, a paper feeding system and a printing signal processing circuit, among others.

Now, a polymeric compound having two or more than two monomer unit structures, each being expressed by the general formula (2) above, will be described.

An image forming material according to the invention may contain one or more than one polymeric compound according to the invention along with a pigment or a dye. The compound or compounds may be dispersed either in water or in a solvent, although an image forming material obtained by dispersing one or more than one polymeric compound according to the invention in water can suitably be used for ink-jet recording. Of polymeric compounds having a chemical structure expressed by the general formula (2), those having a polyoxyethylene structure, which makes the image forming material suitably hydrophilic, can be particularly advantageous when used with an aqueous solvent.

The inventors of the present invention presume that, when a polymeric compound according to the invention is dispersed in water, it forms a micelle type structure to make it highly dispersible so that it is dispersed stably. On the other hand, when it is dispersed in a solvent, the inventors believe that it forms an inverted micelle structure to make it highly dispersible so that it is dispersed stably. In either case, additives such as a sub-solvent, an antioxidant, one or more than one surfactant, one or more than one polymer and/or ultraviolet ray absorbing agents may be used with a polymeric compound according to the invention.

Specific examples of structures having two or more than two monomer unit structures, each being expressed by the general formula (2) above, include the following:

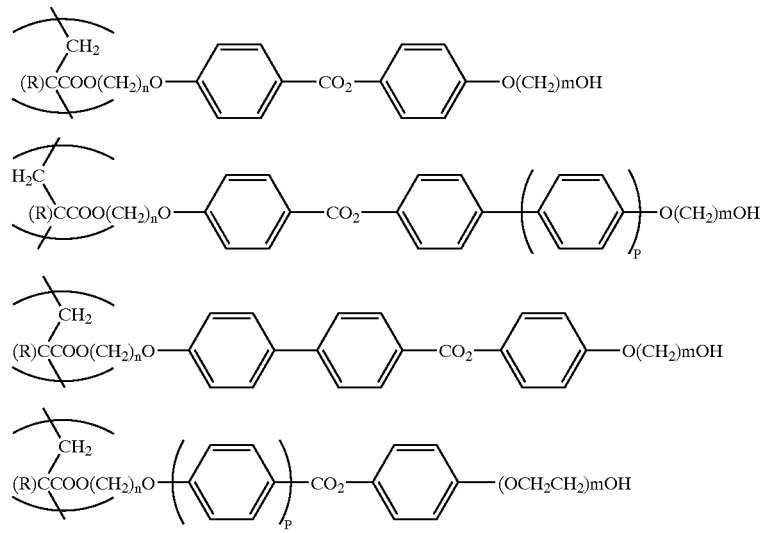

-continued

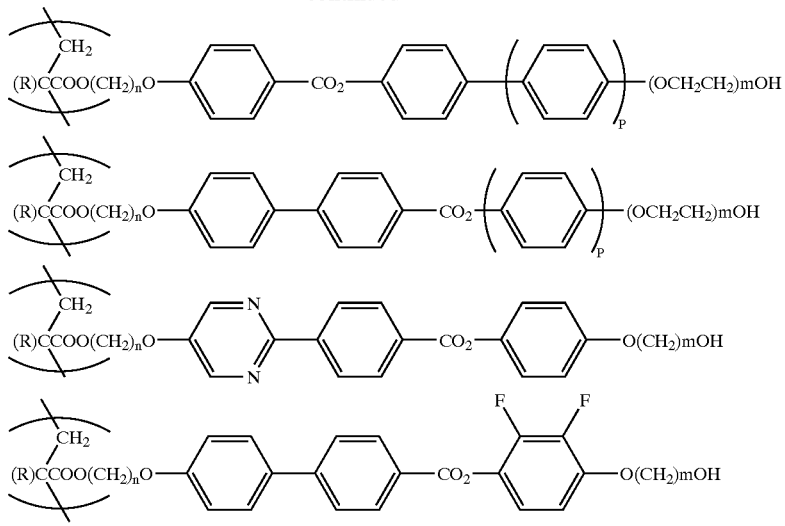

where R represents a hydrogen atom or a methyl group, n represents an integer between 1 and 20, m represents an integer between 1 and 20 and P represents an integer between 1 and 5.

While a polymeric compound having two or more than two monomer unit structures, each being expressed by the general formula (2) above, is used for the purpose of the invention, it is also possible to use a so-called copolymeric compound additionally having one or more than one monomer unit structure, which is different from those of the formula (2). From the viewpoint of the effects and the advantages of the present invention, a polymeric compound according to the invention contains two or more than two monomer unit structures, each being expressed by the general formula (2) above, by about 20 mol % or more.

An image forming material according to the invention is characterized by using a compound or polymeric compound having a structure expressed by the general formula (1) or (2). Structural characteristics of this compound are such that it has both a hydrophilic part and a hydrophobic part along with a site having an aromatic ring somewhere in the middle, which makes the compound show a strong affinity for coloring materials, such as a dye and a pigment. From the viewpoint of providing suitable hydrophilicity, a compound having a polyoxyethylene structure can suitably be used with an aqueous solvent.

The inventors of the present invention believe that an image forming material and a polymer dispersion liquid crystal device according to the invention show an excellent dispersion property, because of both hydrophilicity and hydrophobicity, as well as the affinity for coloring materials of dyes and pigments.

While a polymeric compound having two or more than two monomer unit structures, each being expressed by the general formula (2) above, may be obtained by polymerizing any of the above-described compounds adapted to polymerization, it may alternatively be prepared by mixing a monomer according to the invention with a pigment, water and one or more that one additive to produce a well-dispersed state for the compound and subsequently subject it to a polymerizing process, typically using ultraviolet rays as described earlier.

It is known that ordinary dispersants, such as surfactants, can easily lose their dispersibility by an external excitation, such as heat, acid or base. On the other hand, in various steps of an image forming process including transfer of ink, printing or development, transfer and fixation where ink is exposed to different environments, ink is required to pass through those steps without losing its chemical stability and dispersibility. From this point of view, an ink material formed by using a polymeric compound according to the invention can be highly suitable for use with various image forming methods, including regular printing, ink-jet recording and electrophotography. Therefore, compounds according to the invention can provide very useful image forming materials.

Now, an embodiment of polymer dispersion liquid crystal device according to the invention will be described by referring to FIGS. 2 and 3.

Figure 2:
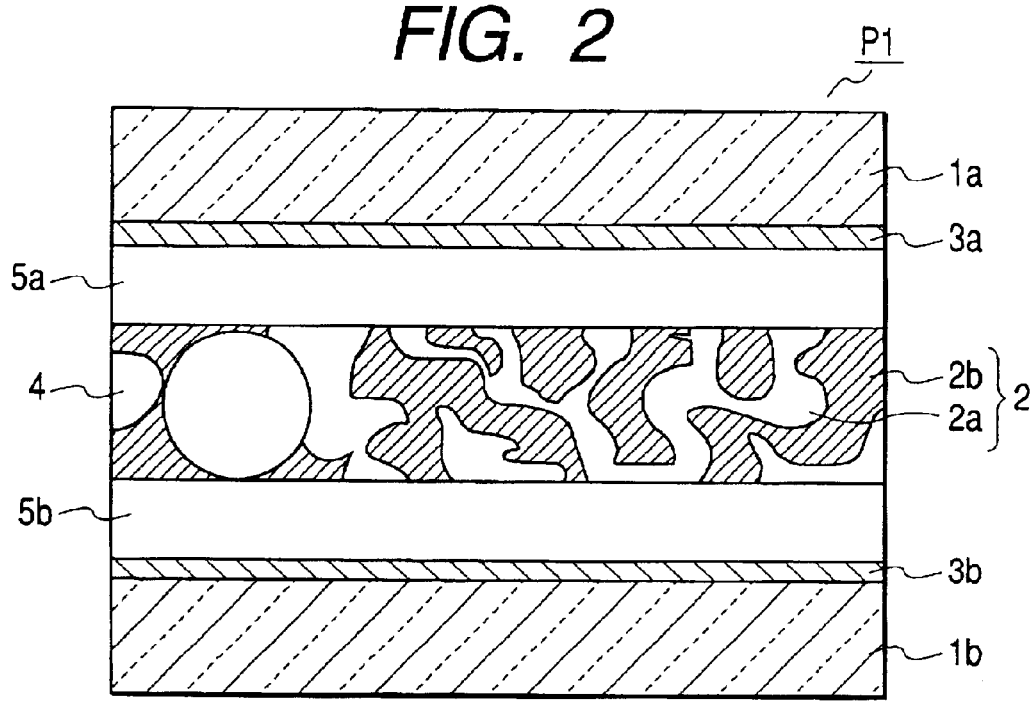
FIG. 2 is a schematic cross-sectional view of an embodiment of a polymer dispersion liquid crystal device according to the invention, illustrating its structure.

Referring to FIG. 2, the embodiment of a liquid crystal device according to the invention and denoted generally by reference symbol $P_1$ comprises a pair of substrates 1a and 1b disposed with a predetermined gap separating them, polymer dispersion liquid crystal 2 arranged between the paired substrates 1a and 1b and a pair of electrodes 3a and 3b arranged to sandwich the polymer dispersion liquid crystal between them.

Novel compounds invented and synthetically prepared by the inventors of the present invention are characterized by having a polyoxyalkyl chain and OH or COOH at an end or on a side chain. A polymeric compound having two or more than two monomer unit structures, each being expressed by the general formula (2) above, may be a homopolymer having only such unit structures or a so-called copolymeric compound additionally having one or more than one monomer unit structure, which is different from those of the formula (2). There is no specific limit on the repetition number of the formula (2). Therefore, a polymeric compound according to the invention may have any desired number of monomer unit structures. If a polymer is defined as normally having ten thousands or more monomer unit structures, a novel compound according to the invention may be a dimer, trimer or oligomer having less than ten thousands monomer unit structures.

Meanwhile, of novel compounds according to the invention, some have properties like those of a liquid crystal, while systems obtained by mixing one or more than one compound according to the invention, which do not have properties like those of the liquid crystal, with other compound(s) may show properties like those of the liquid crystal. A compound that does not have a liquid crystal phase by itself, but can be made to show properties like those of a liquid crystal when mixed with a liquid crystal material, will be referred to as a potential liquid crystal type compound or potential liquid crystal type polymeric compound hereinafter. The other compound(s) as cited above may be selected from novel compounds according to the invention, or alternatively, from known liquid crystal compounds, such as low molecular weight liquid crystal compounds, which will be described hereinafter.

The polymer dispersion liquid crystal 2 of this embodiment is obtained by dispersing a known low molecular weight liquid crystal composition into a potential liquid crystal type polymeric compound, which is a novel polymeric compound according to the invention. The polymer dispersion liquid crystal 2 comprises a potential liquid crystal type polymeric compound (matrix polymer) 2a and a low molecular weight liquid crystal composition 2b arranged in a state of phase separation. The potential liquid crystal type polymeric compound 2a is arranged to form a network (polymer network type) or to be dispersed (polymer dispersion type). The low molecular weight liquid crystal composition 2b is a liquid crystal material having a switching property responding to the voltage applied to it via the paired electrodes 3a and 3b.

While the potential liquid crystal type polymeric compound 2a of this embodiment refers to a polymeric material, which can potentially operate as a liquid crystal, it is effective for the purpose of the present invention to use a potential liquid crystal type polymeric compound whose monomer unit structures contain an OH group or a COOH group in order to make the low molecular weight liquid crystal composition 2b show a memory property.

As for the mixing ratio of the potential liquid crystal type polymeric compound 2a and the low molecular weight liquid crystal composition 2b, the content of the potential liquid crystal type polymeric compound 2a is between 1 wt % and 99 wt %, preferably between 2 wt % and 90 wt %, more preferably between 5 wt % and 70 wt % from the viewpoint of the necessity of allowing the two components to show respective physical properties. On the other hand, the content ratio of the low molecular weight liquid crystal composition 2b is between 1 wt % and 99 wt %, preferably between 10 wt % and 98 wt %, more preferably between 30 wt % and 95 wt %.

The potential liquid crystal type polymeric compound contains monomer unit structures having an OH group or a COOH group preferably by more than 30 wt %, more preferably by more than 50 wt %. These values are related to the memory property of a polymer dispersion liquid crystal according to the invention. When a potential liquid crystal type polymeric compound and a low molecular weight liquid crystal material are mixed with each other, molecules of the low molecular weight liquid crystal are oriented in the direction of orientation of the molecules of the polymeric compound in an initial state, because of the van der Waals force between the molecules of the two substances along their interfaces. Normally, when an electric field is applied to the mixture to cause the low molecular weight liquid crystal to be switched to change the orientation, the initial orientation is restored immediately after removing the electric field, because this interaction of the two substances is highly dominant if compared with any other interactions that may be involved. According to the invention, a structure that can make a new interaction other than the van der Waals force effective among liquid crystal molecules is introduced to make the low molecular weight liquid crystal composition 2b show the memory property after switching off the electric field. Thus, the memory property obtained by the present invention may be attributable to a new state of orientation, which is made dominant by the interaction of the low molecular weight liquid crystal and the aggregation structure formed collectively by OH groups or COOH groups relative to the state of orientation caused by the van der Waals force among ordinary molecules of the liquid crystal. The inventors of the present invention believe that this effect is obtained by the interaction of the aggregation structure formed collectively by OH groups or COOH groups and the low molecular weight liquid crystal caused by their polarities or hydrogen bonds. Therefore, it is important to make the potential liquid crystal type polymeric compound to contain OH groups or COOH groups to an extent sufficient to make the interaction effective, and the above-cited content ratio ensures such an effect.

Since the above interaction takes place along the interfaces of the two substances, it is not desirable to make the relative volume of the interfaces too small. More specifically, the average diameter of the domains of the low molecular weight liquid crystal is preferably not greater than 50 $\mu$m, more preferably not greater than 20 $\mu$m.

The above-described polymer dispersion liquid crystal 2 can be prepared by injecting a mixture solution obtained by mixing a liquid crystal type monomer, rod-shaped liquid crystal and a polymerization initiator into the gap between the substrates and subsequently irradiating the solution with ultraviolet rays. Now, the polymer dispersion liquid crystal 2 will be described further in terms of using a potential liquid crystal type compound and a rod-shaped liquid crystal for the low molecular weight liquid crystal material.

A rod-shaped liquid crystal to be used for the purpose of the invention is a thermotropic liquid crystal, such as a nematic liquid crystal, a cholesteric liquid crystal, a smectic liquid crystal and/or a chiral smectic liquid crystal. Preferably, a mixture of two or more than two rod-shaped liquid crystal materials is used for the purpose of expanding the liquid crystal temperature range and optimizing various physical properties thereof. A two-frequency drive type liquid crystal may preferably be used. A two-frequency drive type liquid crystal is a liquid crystal whose dielectric anisotropy shows different signs depending on the frequency of the electric field applied to it. For example, molecules of a two-frequency drive type liquid crystal may be oriented in a direction parallel to the direction of the applied electric field if the electric field has a low frequency and in a direction perpendicular to the direction of the applied electric field if the electric field has a frequency higher than the relaxation frequency of the dielectric anisotropy. Examples of compounds and compositions of a two-frequency drive type liquid crystal, which can be used for the purpose of the present invention, include a low molecular weight liquid crystal substance selected from 2,3-dicyano-4-pentyloxyphenyl-4-(trans-4-ethylcyclohexyl)benzoate, 2,3-dicyano-4-pentyloxyphenyl-trans-4-propyl-1-cyclohexanecarboxylate, 2,3-dicyano-4-ethoxyphenyl-4-(trans-4-pentylcyclohexyl)benzoate, 2,3-dicyano-4-ethoxyphenyl-4-(trans-4-butylcyclohexyl)benzoate, 2,3-dicyano-4-butoxyphenyl-4-(trans-4-butylcycloxyl)benzoate, or a mixture of two or more than two different substances selected from the ones above. A liquid crystal device according to the invention can memorize the original state by applying a high frequency electric signal after switching to a memory state by means of a low frequency electric signal when a two-frequency drive type liquid crystal is used.

A potential liquid crystal type compound other than those listed above may be added to form a mixture. One or more than one coloring material and an antioxidant may also be added.

Examples of potential liquid crystal type monomers that can be used for the purpose of the invention include potential liquid crystal type compounds having a polymerizing group, such as an acrylic group, a methacrylic group or an epoxy group. In order to provide a memory property that is indispensable for the present invention, potential liquid crystal type monomers having an OH group or a COOH group are preferably used. Furthermore, cross-linking type multi-functional monomers are preferably used in order to accelerate phase separation. In other words, the potential liquid crystal polymer $2a$ may contain cross-linking units having an OH group. An example of a cross-linking monomer that can be used for the purpose of the invention is expressed by the structural formula below.

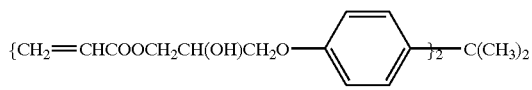

Meanwhile, a liquid crystal device $P_1$ according to the invention may be made to have a reverse mode (where a scattered state appears when a voltage is applied). A liquid crystal device having a reverse mode can be obtained by injecting a liquid crystal between a pair of substrates $1a$ and $1b$, which have been subjected to a uniaxial orienting treatment, thereby turning the liquid crystal into a nematic liquid crystal and causing photopolymerization to take place under this condition, so that both the potential liquid crystal type polymeric compound and the low molecular weight liquid crystal may be brought into a uniaxially oriented state. This operation will be discussed in greater detail below.

Uniaxial orientation control films (denoted by reference symbols $5a$, $5b$ in FIGS. 2 and 3) can be formed by coating the substrates with a film of an inorganic compound, such as silicon monoxide, silicon dioxide, aluminum oxide, zirconia, magnesium fluoride, cerium oxide, cerium fluoride, silicon nitride, silicon carbide or boron nitride or an organic compound, such as a polyvinyl alcohol, a polyimide, a polyimideamide, a polyester, a polyamide, a polyesterimide, a polyparaxylene, a polycarbonate, a polyvinyl acetal, a polyvinyl chloride, a polystyrene, a polysiloxane, a cellulose resin, a melamine resin, a urea resin or an acryl resin by solution coating, evaporation or sputtering and subsequently rubbing the surface with a fibrous material, such as velvet, cloth or paper. An oblique evaporation process of obliquely coating the substrates with an oxide, such as silicon oxide, may also be used for the purpose of the invention.

Particularly, it is preferable to use a polyimide rubbing film as a uniaxially orienting layer in order to provide an excellent uniaxial orientation. Such a polyimide film can be formed normally by applying it in the form of polyamic acid and subsequently baking it. The use of polyamic acid is advantageous for achieving a high productivity level, because it can easily dissolve into various solvents. Recently, a polyimide soluble in a solvent has been marketed. Such a polyimide is suitable for excellently providing uniaxial orientation and achieving a high productivity level.

While the polymer dispersion liquid crystal 2 may be prepared by using a potential liquid crystal type monomer as a starting material as described above, it may alternatively be prepared by directly mixing a polymerized potential liquid crystal polymeric compound with a low molecular weight liquid crystal in a separate step.

Figure 3:
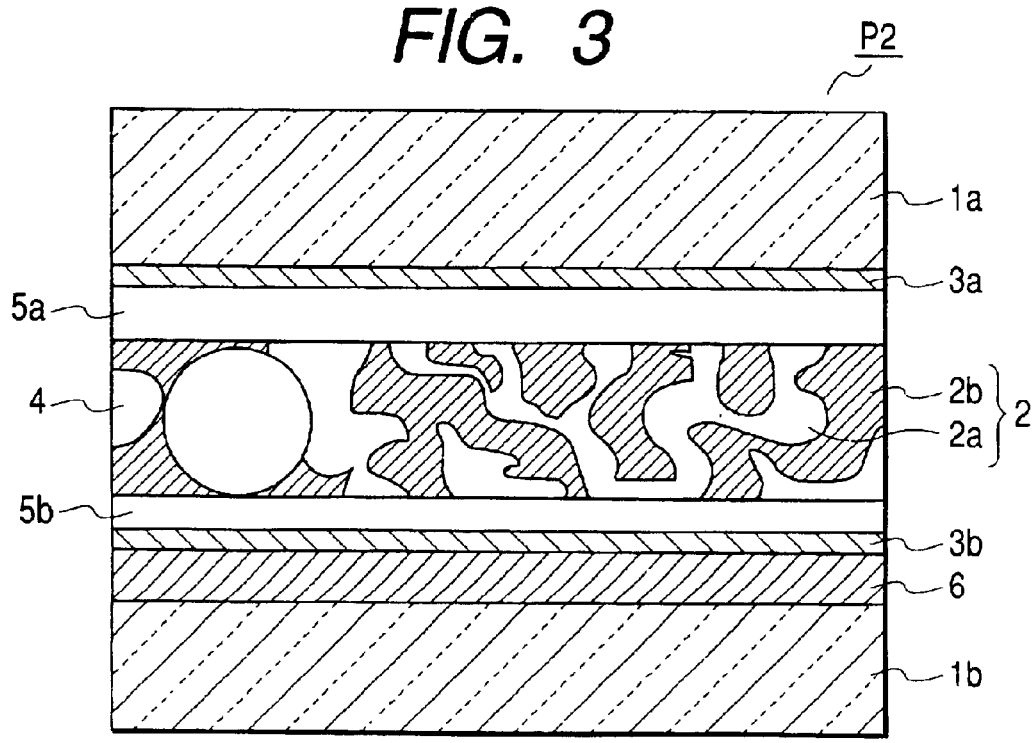
FIG. 3 is a schematic cross-sectional view of another embodiment of a polymer dispersion liquid crystal device according to the invention, illustrating its structure.

Referring to FIGS. 2 and 3, reference symbol 4 denotes spacers that may be silica beads, resin beads or bulkhead-shaped spacers that are commercially available. The gaps separating the spacers are preferably between 1.0 and 100 $\mu$m from the viewpoint of optimizing the contrast, although the optimal range and the upper limit may vary depending on the selected liquid crystal material.

The polymer dispersion liquid crystal 2 may contain an antioxidant, a radical trapping agent, a photoreaction suppressing agent, a polymerization suppressing agent and/or one or more than one coloring materials in addition to the potential liquid crystal polymer $2a$ and the low molecular weight liquid crystal composition $2b$. Particularly, addition of a polar additive to a small ratio can advantageously improve the memory property, because COOH groups are apt to give rise to a dimer association when the potential liquid crystal polymer $2a$ contains monomer unit structures having a COOH group.

For the purpose of the invention, the polymer dispersion liquid crystal 2 prepared by using the above-described manufacturing steps may be subjected to a heat treatment as a post-treatment process in order to improve the orientation. The potential liquid crystal polymeric compound and/or the liquid crystal composition tend to organize themselves to improve the orientation when a heat treatment is used.

Commercially available glass or plastic plates designed as substrates for liquid crystal devices may be used for the substrates $1a$ and $1b$. The electrodes $3a$ and $3b$ may be transparent electrodes, typically made of ITO (indium tin oxide), or reflection electrodes, typically made of metal. The electrodes $3a$ and $3b$ may be coated with respective insulating layers arranged for the purpose of preventing an electric short circuit and/or respective orientation control films $5a$ and $5b$ arranged for the purpose of orientating the polymer dispersion liquid crystal 2. While it is advantageous that the orientation control films $5a$, $5b$ are subjected to a uniaxial orienting treatment, the upper and lower uniaxial orienting treatments may be symmetric or asymmetric relative to each other. Additionally, each pixel may be provided with a color filter to provide a color display capability.

A liquid crystal device according to the invention may be of the transmission type as shown in FIG. 2 or of the reflection type as shown in FIG. 3. Reference symbol 6 in FIG. 3 denotes a light absorbing plate arranged between the lower electrode $3b$ and the lower substrate $1b$. However, the light absorbing plate may be replaced by a light reflecting plate or a light scattering plate for the purpose of improving the image brightness. It is not necessary to arrange such a light absorbing plate at the position illustrated in FIG. 3 (between the lower electrode $3b$ and the lower substrate $1b$). It may alternatively be arranged at the rear side (behind) the liquid crystal device $P_2$.

The liquid crystal device may be made to be of the active matrix type by arranging an electrode $3a$ and $3b$ and connecting an active element for each pixel.

EXAMPLES OF SYNTHESIS

Compounds according to the invention can be synthetically produced by a method as described below. The compounds used for the synthetic methods described below are simply examples and the present invention is by no means limited thereto.

1) An example of synthesis of a liquid crystal compound having an OH group at an end and a polymerizing group at the other end of the molecule

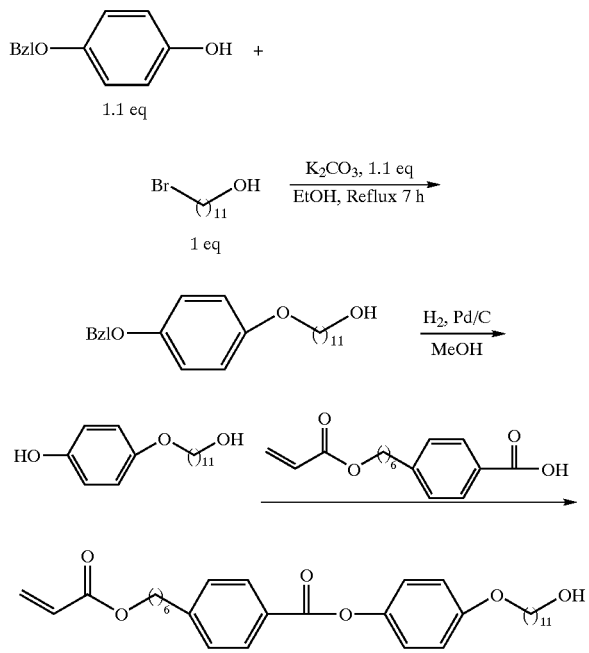

2) An example of synthesis of a liquid crystal compound having a polyethylene oxide chain at an end and a polymerizing terminal at the other end of the molecule

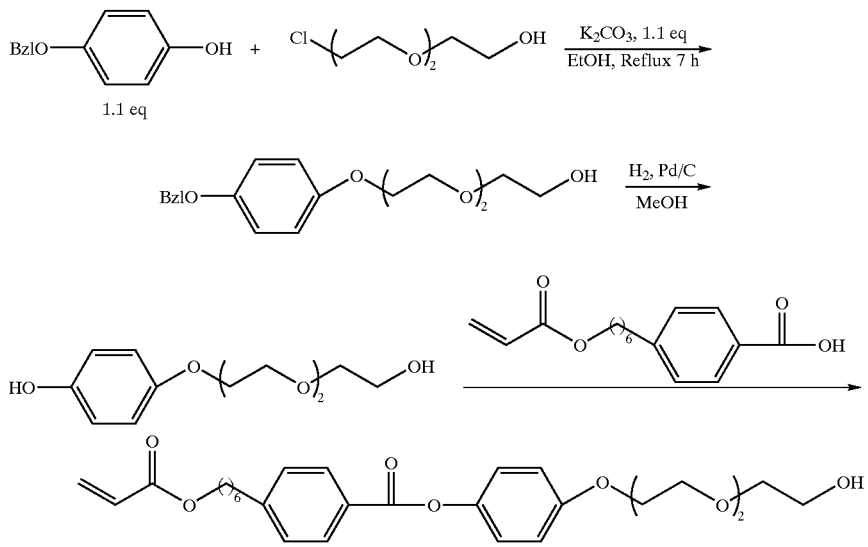

Now, the methods for synthetically producing the above compounds will be described in greater detail.

Synthesis of Compound (A)

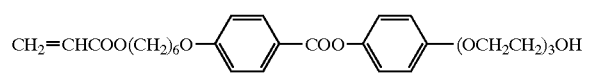

50 mmol of 4-benzyloxyphenol, 55 mmol of potassium carbonate and 55 mmol of 2-(2-(2-chloroethoxy)ethoxy)etanol were heated and refluxed in ethanol for 7 hours. The ethanol was removed by distillation and the ingredients that could dissolve into a mixture solvent of hexane and ethyl acetate were subjected to column chromatography to obtain

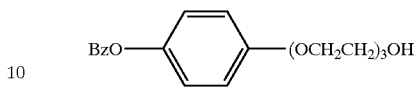

at a yield of 48%.

The obtained compound was debenzylated with palladium carbon in methanol under a flow of hydrogen gas. The debenzylated product was obtained quantitatively. Then, 15 mmol of the product and 15 mmol of

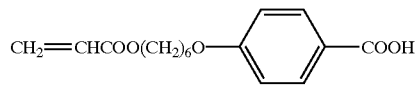

was agitated with 1.2 equivalent of dicyclohexylcarbodiimide in toluene for 40 hours. After filtration, the toluene was removed by distillation and the remaining ingredients were subjected to column chromatography to obtain the target compound at a yield of 28%.

Synthesis of Compound (B)

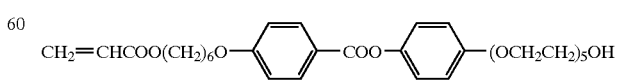

The target compound was obtained by using the above-described synthesizing method except that 2-(2-(2- chloroethoxy)ethoxy)ethanol was replaced by 2-(2-(2-(2-(2-chloroethoxy)ethoxy)ethoxy)ethoxy)ethanol.

Synthesis of Compound (C)

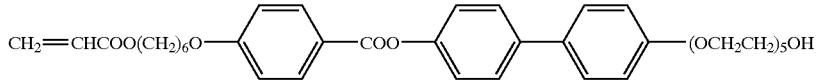

The target compound was obtained by using the above-described synthesizing method except that 4-benzyloxyphenol was replaced by 4-(4-benzyloxyphenyl)-phenol.

Compound (D) having a different alkyl chain length was synthetically produced in a similar manner.

Compound (D)

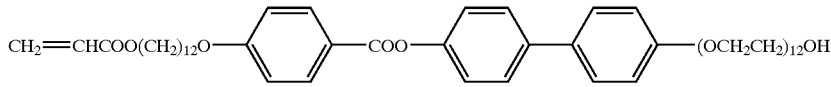

Compounds (E) and (F) were synthetically produced by using 11-chloroundecanol.

Compound (E)

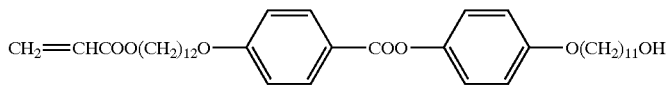

Compound (F)

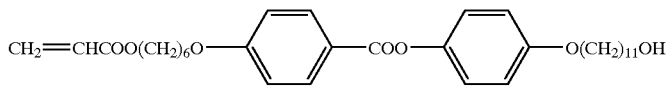

The polymeric compounds listed below were also prepared by synthesis and some of their physical properties were observed. The obtained results are summarized below.

Polymeric Compound (G) Obtained from (A)

5 mmol of compound (A) was subjected to a polymerizing reaction with azobisisobutylonitrile (AIBN), which is a polymerization initiator, in toluene at 50° C. for 20 hours. The obtained polymeric compound (G) was isolated by reprecipitation.

The molecular weight was observed by size exclusion chromatography to find that the polystyrene-reduced weight average and number average molecular weights Mw and Mn were equal to 13,500 and 8,800, respectively. As a result of DSC observation, the glass transition temperature Tg was found to be 21° C.

Polymeric Compound (H) Obtained from (B)

Polymeric compound (H) was obtained by subjecting compound (B) to a polymerizing reaction in a manner as described above.

The molecular weight was observed by size exclusion chromatography to find that the polystyrene-reduced weight average and number average molecular weights Mw and Mn were equal to 12,100 and 7,800 respectively. As a result of DSC observation, the glass transition temperature Tg was found to be 15° C.

Polymeric Compound (I) Obtained from (C)

Polymeric compound (I) was obtained by subjecting compound (C) to a polymerizing reaction in a manner as described above.

The molecular weight was observed by size exclusion chromatography to find that the polystyrene-reduced weight average and number average molecular weights Mw and Mn were equal to 14,100 and 9,800, respectively. As a result of DSC observation, the glass transition temperature Tg was found to be 22° C.

Now, the operation of this embodiment will be described.

As a voltage is applied to the paired electrodes $3a$ and $3b$, the state of the orientation of the low molecular weight liquid crystal composition $2b$ is shifted (switched) relative to the state of the orientation of the polymer dispersion liquid crystal 2 to modulate light being transmitted or reflected there. Different images can be displayed by conducting such a modulating operation for each pixel. An analog gradation display can be realized by controlling the applied voltage.

Now, the advantages of this embodiment will be discussed.

With this embodiment, the matching/mismatching of refractive indexes that participate in scattering light is controlled by applying a voltage to the electrodes $3a$ and $3b$ to remarkably improve the brightness and the contrast of the displayed image. Additionally, with this embodiment, since the polymer dispersion liquid crystal 2 has a memory property, the displayed image is maintained after suspending the application of voltage to significantly reduce the power consumption rate.

Meanwhile, when the potential liquid crystal type polymeric compound $2a$ and the low molecular weight liquid crystal composition $2b$ are in a state of insufficient phase separation or not in a state of clear phase separation, as in the prior art cases, there can arise problems of practical use such that the response time for a switching operation is very long or indiscriminable and/or the device needs to be subjected to thermal treatment when it has to be reset to the initial state. However, this embodiment is free from such problems, because the potential liquid crystal type polymeric compound 2a and the low molecular weight liquid crystal composition 2b are in a definite state of phase separation.

Now, the present invention will be described further by examples.

Example 1

Compound A1 used in this example is:

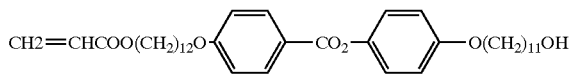

Compound A2 used in this example is:

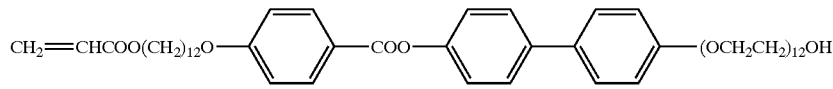

Pigment used in this example:
Carbon Black Mogul L available from Cabot.

Compound A1, compound A2, carbon black, glycerol, isopropyl alcohol, and distilled water were mixed by respective weight portions of 2, 7, 4, 19, 10 and 60 in a sand mill to obtain a dispersion type ink, which was then filled into the black ink tank of an ink-jet printer (type: BJC-430J) available from Canon and used for a printing operation conducted on plain paper.

Example 2

Polymeric compound A3 obtained by means of radical polymerization of A2 of Example 1 was used in this example. Compound A3, carbon black, glycerol, isopropyl alcohol, and distilled water were mixed by respective weight portions of 6, 3, 18, 10 and 63 in a sand mill to obtain a dispersion type ink, which was then filled into the black ink tank of an ink-jet printer (type: BJC-430J) available from Canon and used for a printing operation conducted on plain paper.

Example 3

Polymeric compound A4 obtained by means of radical polymerization of compound A1 and compound A2 of Example 1 at a molar ratio of 1:9 was used in this example. An ink solution was prepared and tested as in Example 2, although compound A3 of Example 2 was replaced by this compound.

Results of Printing

The results obtained by using the inks of Examples 1 through 3 are listed below. The printed images were very clear. The results were functionally evaluated and numerically scored. A clear, printed image that was free from feathering and bleeding and showed a high optical reflection density obtained a high score. The images obtained in Examples 1 through 3 were excellent and free from the problem of feathering, compared with images printed by using the black dye ink being sold with BJC430J type printers.

As a result of the visual evaluation of function, the use of the ink of Example 2 and that of the ink being sold with BJC430J type printers were classified respectively as level 3 and level 1, whereas that of Example 1 and that of Example 3 were classified as level 2 and level 3, respectively. Thus, compounds according to the invention were proved to be excellent dispersants.

Examples of dispersive dyes and pigments that can be used like the above listed carbon black for the purpose of the invention are listed below. Dyes include C. I. Direct Black 17, IJA 260, C. I. Direct Yellow 11, UR-016, C. I. 42090, whereas pigments include carbon blacks, such as No. 2300, No. 900, MCF 88, No. 33, No. 40, No. 45, No. 52, MA 7, MA 8, #220B and MA-100 available from Mitsubishi Chemical Industries, Raven 1255 and Raven 1060 available from Columbia Carbon, Regal 330R, Regal 660R and Mogul L available from Cabot and Color Black FW18, Printex 35 and Printex U available from DEGUSSA. Color pigments that can be used for the purpose of the invention include organic pigments, such as azo type pigments, isoindolinone type higher pigments, quinacridone type higher pigments, dioxane violet and perynone-perylene type higher pigments and inorganic pigments such as ultra-marine, Persian blue, titanium yellow and molybdenum red.

According to the invention, there is provided an image forming material that is a highly functional and highly effective dispersion type ink.

Example 4

In this example, a transmission type liquid crystal panel (liquid crystal device) $P_1$ as shown in FIG. 2 was prepared.

The polymeric compound 2a of the polymer dispersion liquid crystal composition 2 of the liquid crystal panel of this example was prepared by using polymeric compound A1 and polymeric compound A2 as shown below. Two-frequency drive nematic liquid crystal DF01XX available from Chisso was used for the low molecular weight liquid crystal composition B. The mixing ratio of polymeric compounds A1 and A2 and the low molecular weight liquid crystal composition B was 10:10:80 and 2,6-ditert-butyl-4-methylphenol and polymerization initiator Irgacure 184 available from Ciba Geigy were added at respective ratios of 200 ppm and 2 wt %.

Polymeric Compound A1:

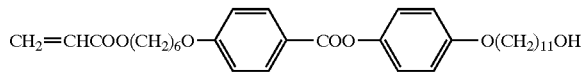

Polymeric Compound A2:

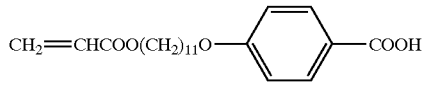

Now, the method of manufacturing a liquid crystal panel $P_1$ as shown in FIG. 2 will be described.

First, ITO electrodes 3a and 3b were formed respectively on glass substrates 1a and 1b and a 2.1 wt % solution of polyamic acid that is a precursor of a polyimide having monomer unit structures as shown below was applied twice on the surface of the substrates by spin coating, respectively, for 5 seconds at 500 rpm and for 30 seconds at 1,500 rpm.

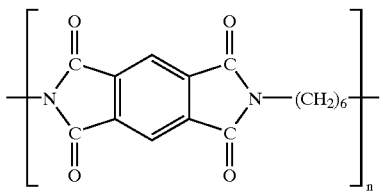

Subsequently, the applied solution was dried at 80° C. for five minutes and then heated and baked at 220° C. for an hour to produce orientation control films 5a and 5b, which were then rubbed by using a nylon cloth for a uniaxial orienting treatment.

Thereafter, a predetermined IPA solution (prepared by dispersing resin beads 4 at a ratio of 0.01 wt %) was applied onto the surface of one of the substrates (more in detail, onto the surface of the orientation control film), or the substrate 1b, by spin coating for 10 seconds at 1,500 rpm so as to make scattered resin beads 4 show a dispersion density of 1001 mm.

Then, a thermosetting type liquid adhesive agent was applied to the peripheral edges of the glass substrate 1b by printing and the glass substrates 1a and 1b were bonded together in such a way that their rubbing axes agree with each other. Thereafter, the substrates were heated in an oven at 150° C. for 90 minutes to set the adhesive agent.

Subsequently, the polymer dispersion liquid crystal composition 2 was evenly mixed in an isotropic phase condition and the mixture was poured into the gap between the substrates at 100° C. under atmospheric pressure. It was observed through a polarizing microscope that the composition had been uniaxially oriented in the rubbing direction at 50° C. Under this condition, the polymeric compound was exposed to ultraviolet rays showing a center wavelength of 365 nm and an energy level of about 12 mW/cm² for five minutes for polymerization. As a result, a complete liquid crystal panel $P_1$ was produced.

The rod-shaped low molecular weight liquid crystal showed a good phase separation as a result of the exposure to ultraviolet rays. When the sample is set in the HOT-STAGE (produced by Mettler) and observed by a polarizing microscope, the low molecular weight liquid crystal material had been turned to an isotropic liquid at 120° C., which is equal to or is higher than the temperature at which the rod-shaped low molecular weight liquid crystal DF01XX becomes isotropic, so that only the texture of the polymerized polymeric compound was observed. Since the extinction was observed through the polarizing microscope, it was found that the polymeric compound had been uniaxially oriented along the rubbing axis. It was also observed through the polarizing microscope that the low molecular weight liquid crystal had been uniaxially oriented at room temperature.

An electric signal of 30V and 60 Hz was applied to the prepared liquid crystal panel $P_1$ to observe its operation. As a result, it was found that the liquid crystal responded properly. When the application of the voltage was suspended, it was found that the response of the liquid crystal was stored there to prove the memory property of the polymer dispersion liquid crystal 2.

The change in the transmittance due to the application of the voltage was observed by means of a photo-multiplier to find that the transmittance after the end of the voltage application was $2/3$ of the transmittance before the voltage application.

The change in the scattered light of the specimen of liquid crystal device of this example was also visually observed to find that it can be used as a photo-shutter.

Comparative Example

A liquid crystal panel same as that of Example 4 was prepared except that the polymeric compounds A1 and A2 were replaced by polymeric monomer a having a structure as shown below and the mixing ratio of the polymeric monomer a to the low molecular weight liquid crystal composition B was 20:80.

$CH_2=CHCOO(CH_2)_6O—Ph—COO—Ph—OC_6H_{13}$

An electric signal of 30V and 60 Hz was applied to the prepared liquid crystal panel to observe its operation by means of a polarization microscope. As a result, it was found that the liquid crystal had showed a non-scattered state, but quickly restored the state before the application of the voltage (non-scattered state) and it did not show any memory property at all.

The change in the transmittance due to the application of the voltage was observed by means of a photo-multiplier to find that the ratio of the transmittance after the end of the voltage application to the transmittance before the voltage application was 1.0.

Example 5

In this example, a liquid crystal panel (liquid crystal device) $P_2$ as shown in FIG. 3 was prepared by using a mixing ratio of polymeric compounds A1 and A2 and the low molecular weight liquid crystal composition B was 10:10:80 and a triethylamine was added by 1.5 wt % to the mixture. Otherwise, the method used for preparing the specimen of Example 4 was used.

The response of the liquid crystal was observed through a polarizing microscope by applying a voltage to it as in the case of Example 4 to prove the memory property of the device.

The change in the transmittance due to the application of the voltage was observed by means of a photo-multiplier to find that the transmittance after the end of the voltage application was $10/17$ of the transmittance before the voltage application.

When an electric signal of 30V and 100 kHz (which is a frequency that switches the two-frequency drive type liquid crystal to the homogeneous direction) is applied to the cell, the liquid crystal was restored to the original state. It was found that the liquid crystal device can be used as an optical shutter.

Example 6

In this example, a cross-linking monomer A3 having a structure as shown below was used in addition to the polymeric compounds A1 and A2 and the low molecular weight liquid crystal composition B of Example 4.

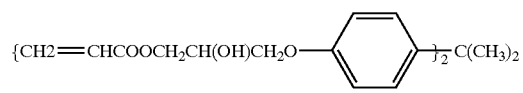

The materials A1, A2, A3 and B were mixed to a mixing ratio of A1: A2:A3: B=7:7:6:20 and a triethylamine was added by 1.0 wt % to prepare polymer dispersion liquid crystal 2.

Otherwise, the method used for preparing the specimen of Example 4 was used.

The response of the liquid crystal was observed through a polarizing microscope by applying a voltage to it as in the case of Example 4 to prove the memory property of the device.

The change in the transmittance due to the application of the voltage was observed by means of a photo-multiplier to find that the transmittance after the end of the voltage application was $10/18$ of the transmittance before the voltage application.

It was found that the liquid crystal device can be used as an optical shutter.

A liquid crystal device according to the invention comprises one or more than one potential liquid crystal type polymeric compound and a low molecular weight liquid crystal composition in a state of phase separation relative to each other and the liquid crystal responds to a voltage applied to it via a pair of electrodes and stores its response after the suspension of the voltage. Therefore, it still displays an image when voltage is no longer applied to reduce the rate of power consumption.

Additionally, since the state of phase separation of the device is perfect, it is free from the drawbacks of known polymer dispersion liquid crystal devices.

Still additionally, with a liquid crystal device according to the invention, switching of light can be realized without using a polarization panel to reduce the cost, because scattering of light is controlled in the device.

Thus, as described above, according to the invention, it is possible to provide a high-quality ink to be used for ink-jet printers by using compounds and polymeric compounds according to the invention. It is also possible to provide a polymer dispersion liquid crystal device having a memory property.

What is claimed is:

1. A liquid crystal device comprising a pair of substrates provided, respectively, with electrodes and a liquid crystal composition containing at least a potential liquid crystal polymeric compound and a liquid crystal compound arranged between the substrates in a state of phase separation, wherein the potential liquid crystal polymeric compound has at least two monomer unit structures, each of the monomer unit structures being expressed by general formula (2):

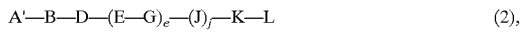   (2), where A' is a polyacryl or polymethacryl monomer unit;
B is a single bond or an alkyl group;
D is a single bond, —O—, —COO— or —OCO—;
E is a substituted or unsubstituted aromatic or aliphatic ring, wherein each E may be the same or different when e is at least 2;
G is a single bond, —O—, —COO—, —OCO—, —CH=CH— or —C≡C—, wherein each G may be the same or different when e is at least 2;
J is a substituted or unsubstituted aromatic or aliphatic ring, wherein each J may be the same or different when j is at least 2;
K is a single bond, —O—, —COO— or —OCO—;
L is an end group wherein L is either an alkyl group or a polyoxyalkylene group, either of which is substituted with —OH or —COOH at an end or a side chain;
e and j are, independently, an integer from 0 to 5, such that e+j≧2, and wherein the liquid crystal compound changes its direction of orientation when a voltage is applied between the electrodes and substantially maintains the direction of orientation after suspending the voltage application.

2. A liquid crystal device according to claim 1, wherein the liquid crystal compound is a low molecular weight nematic liquid crystal.

3. A liquid crystal device according to claim 1, wherein the potential liquid crystal polymeric compound uniaxially orients parallel to the pair of substrates.

4. A process of making a liquid crystal device showing a memory property, the process comprising:

a step of orienting a liquid crystal in a direction by dispersing a liquid crystal compound in a potential liquid crystal polymeric compound in a state of phase separation;

a step of applying an electric field to orient the liquid crystal in another direction; and a step of suspending the electric field, wherein the potential liquid crystal polymer compound has least two monomer unit structures, each of the monomer unit structures being expressed by general formula (2):

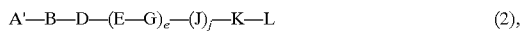   (2), where A' is a polyacryl or polymethacryl monomer unit;
B is a single bond or an alkyl group;
D is a single bond, —O—, —COO— or —OCO—;
E is a substituted or unsubstituted aromatic or aliphatic ring, wherein each E may be the same or different when e is at least 2;
G is a single bond, —O—, —COO—, —OCO—, —CH=CH— or —C≡C—, wherein each G may be the same or different when e is at least 2;
J is a substituted or unsubstituted aromatic or aliphatic ring, wherein each J may be the same or different when j is at least 2;
K is a single bond, —O—, —COO— or —OCO—;
L is an end group wherein L is either an alkyl group or a polyoxyalkylene group, either of which is substituted with —OH or —COOH at an end or a side chain;
e and j are, independently, an integer from 0 to 5, such that e+j≧2.

* * * * *

UNITED STATES PATENT AND TRADEMARK OFFICE
CERTIFICATE OF CORRECTION

PATENT NO. : 6,899,823 B2
DATED : May 31, 2005
INVENTOR(S) : Koichi Sato et al.

It is certified that error appears in the above-identified patent and that said Letters Patent is hereby corrected as shown below:

Title page,
Item [30], Foreign Application Priority Data,
"Dec. 27, 2000 (JP)     2000/399239
Mar. 29, 2001 (JP)     2001 /097341
Mar. 30, 2001(JP)     2001/102511
Dec. 21, 2001 (JP)     2001/388608" should read
-- Dec. 27, 2000 (JP)     2000-399239
Mar. 29, 2001 (JP)     2001-097341
Mar. 30, 2001 (JP)     2001-102511
Dec. 21, 2001 (JP)     2001-388608 --.

Item [57], ABSTRACT,
Line 19, "a" (first occurrence) should read -- an --.

Column 1,
Line 45, "dispresed" should read -- dispersed --; and
Line 67, "disad" should read -- disad- --.

Column 2,
Line 52, "A'—B —D —(—E —G)$_E$ —(J)$_j$ —K —L" should read
-- A'—B —D —(—E —G)$_e$, —(J)$_j$ —K —L --;
Line 55, "polymethacryl)." should read -- polymethacryl. --; and
Line 67, "pro" should read -- pro- --.

Column 6,

Line 49, " 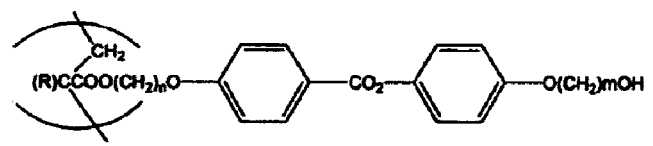 " should read -- 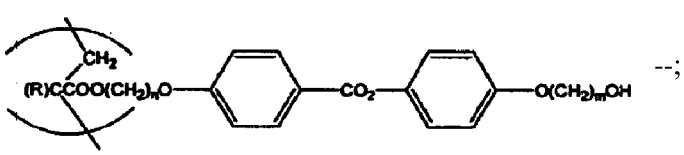 --;

UNITED STATES PATENT AND TRADEMARK OFFICE
CERTIFICATE OF CORRECTION

PATENT NO.      : 6,899,823 B2                                        Page 2 of 4
DATED           : May 31, 2005
INVENTOR(S)     : Koichi Sato et al.

It is certified that error appears in the above-identified patent and that said Letters Patent is hereby corrected as shown below:

Column 6 (cont'd),

Line 54, " 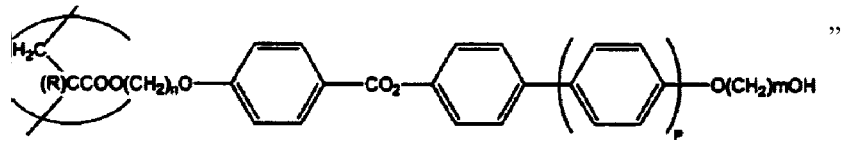 "

should read

-- 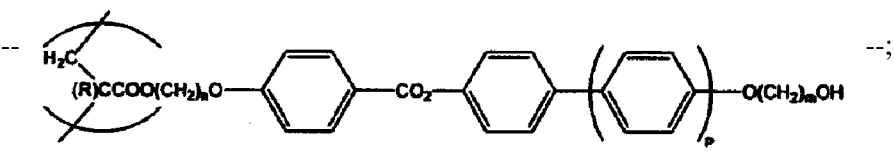 --;

Line 59, " 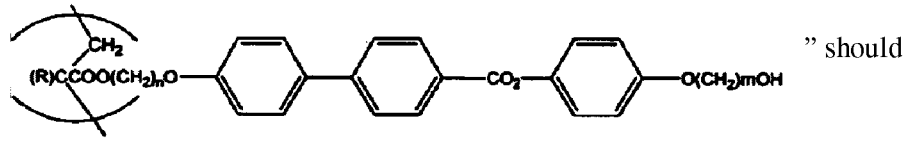 " should read -- 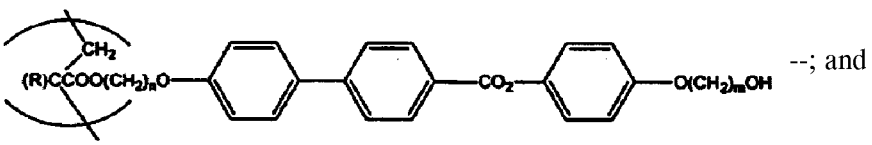 --; and

Line 64, " 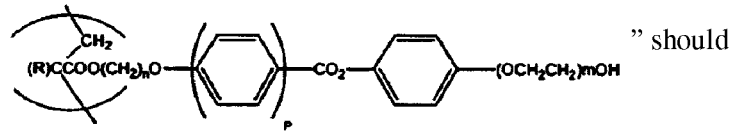 " should read -- 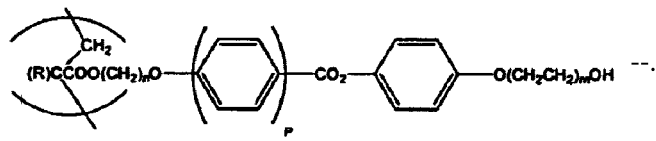 --.

UNITED STATES PATENT AND TRADEMARK OFFICE
CERTIFICATE OF CORRECTION

PATENT NO. : 6,899,823 B2
DATED : May 31, 2005
INVENTOR(S) : Koichi Sato et al.

It is certified that error appears in the above-identified patent and that said Letters Patent is hereby corrected as shown below:

Column 7,

Line 5, " 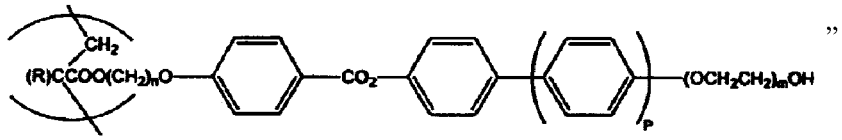 "

should read -- 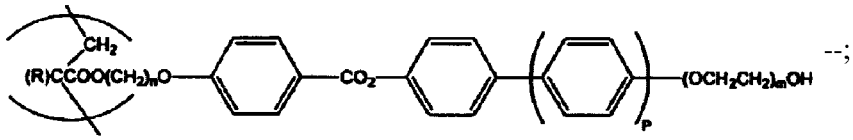 --;

Line 9, " 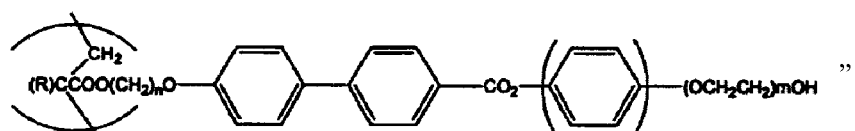 "

should read -- 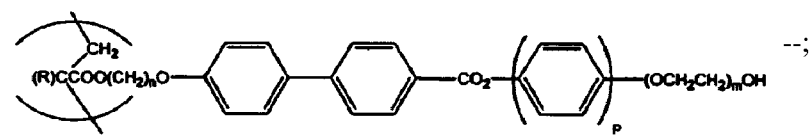 --;

Line 14, " 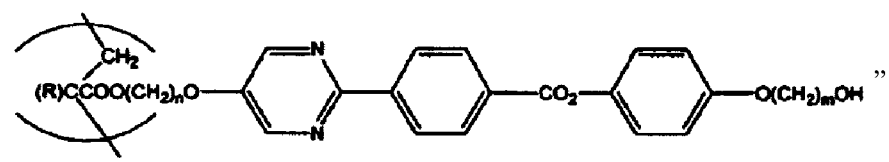 "

should read -- 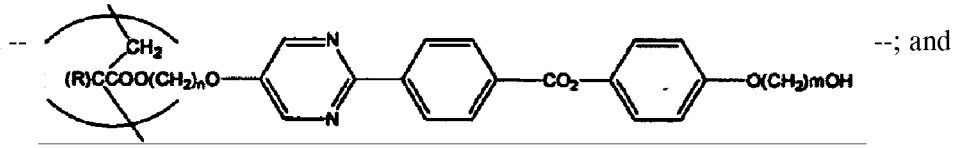 --; and

Line 19, " 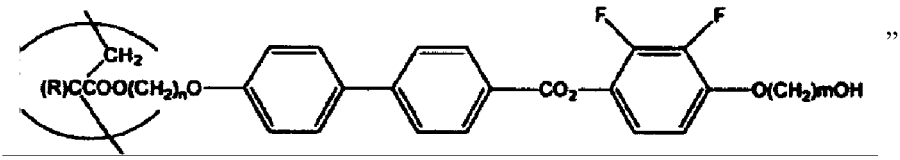 "

should read -- 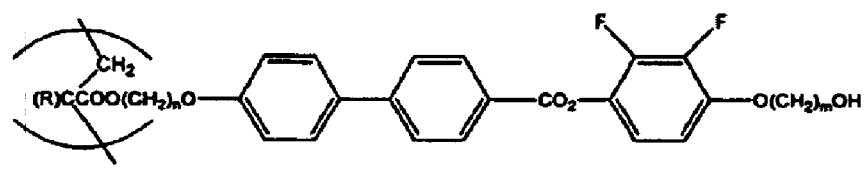 --.

UNITED STATES PATENT AND TRADEMARK OFFICE
CERTIFICATE OF CORRECTION

PATENT NO. : 6,899,823 B2
DATED : May 31, 2005
INVENTOR(S) : Koichi Sato et al.

It is certified that error appears in the above-identified patent and that said Letters Patent is hereby corrected as shown below:

Column 14,
Line 3, "etanol" should read -- ethanol --.

Column 22,
Line 7, "chain;" should read -- chain; and --;
Line 31, "has least" should read -- has at least --; and
Line 54, "chain;" should read -- chain; and --.

Signed and Sealed this

Eighteenth Day of October, 2005

JON W. DUDAS
*Director of the United States Patent and Trademark Office*